(12) United States Patent
Tseng et al.

(10) Patent No.: US 10,346,340 B1
(45) Date of Patent: Jul. 9, 2019

(54) HOT SWAP CONTROL CIRCUIT AND RELATED STORAGE SERVER SYSTEM

(71) Applicant: Wiwynn Corporation, New Taipei (TW)

(72) Inventors: Chia-Nung Tseng, New Taipei (TW); Yao-Hao Yang, New Taipei (TW); Yung-Jung Du, New Taipei (TW)

(73) Assignee: Wiwynn Corporation, New Taipei (TW)

( * ) Notice: Subject to any disclaimer, the term of this patent is extended or adjusted under 35 U.S.C. 154(b) by 0 days.

(21) Appl. No.: 15/989,129

(22) Filed: May 24, 2018

(30) Foreign Application Priority Data

Jan. 22, 2018 (TW) .............................. 107102214 A

(51) Int. Cl.
*G06F 13/16* (2006.01)
*G06F 13/40* (2006.01)

(52) U.S. Cl.
CPC ...... *G06F 13/4081* (2013.01); *G06F 13/1668* (2013.01); *G06F 2213/0026* (2013.01)

(58) Field of Classification Search
None
See application file for complete search history.

(56) References Cited

U.S. PATENT DOCUMENTS

| | | | | |
|---|---|---|---|---|
| 6,178,520 B1 * | 1/2001 | DeKoning | ............ | G06F 3/0607 711/114 |
| 6,678,775 B1 * | 1/2004 | Zink | ................... | G06F 11/0745 710/301 |
| 8,549,191 B2 * | 10/2013 | Mogilnitsky | ........ | G06F 13/4081 710/19 |
| 2006/0294230 A1 * | 12/2006 | Takasu | ................ | H04L 67/1097 709/224 |
| 2007/0136504 A1 * | 6/2007 | Wu | ...................... | G06F 13/4081 710/302 |
| 2013/0138856 A1 | 5/2013 | Liao | | |
| 2017/0149897 A1 * | 5/2017 | Malwankar | ......... | H04L 67/2842 |
| 2017/0242686 A1 | 8/2017 | Vidyadhara | | |
| 2017/0286349 A1 * | 10/2017 | Edirisooriya | ....... | G06F 13/4282 |

FOREIGN PATENT DOCUMENTS

| | | |
|---|---|---|
| CN | 105718408 A | 6/2016 |
| CN | 107368401 A | 11/2017 |
| TW | 200701002 | 1/2007 |
| TW | 200710664 | 3/2007 |

* cited by examiner

*Primary Examiner* — Elias Mamo

(74) *Attorney, Agent, or Firm* — Winston Hsu

(57) ABSTRACT

A hot swap control circuit is utilized for detecting operating status of an NVMe storage module to generate a detection report to a storage server, wherein the detection report indicates at least one of a hot remove event and a hot add event. The hot remove event happens when at least one NVMe storage device of the NVMe storage module is removed, and the hot swap control circuit reports the hot remove event to the storage server by the detection report. Moreover, the hot add event happens when a new NVMe storage device is added to the NVMe storage module, and the hot swap control circuit reports the hot add event to the storage server by the detection report.

13 Claims, 3 Drawing Sheets

HOT SWAP CONTROL CIRCUIT AND RELATED STORAGE SERVER SYSTEM

BACKGROUND OF THE INVENTION

1. Field of the Invention

The present invention relates to a hot swap control circuit and related storage server system, and more particularly, to a hot swap control circuit and related storage server system for Non-Volatile Memory Express storage device.

2. Description of the Prior Art

Open compute project (OCP) is an organization that shares hardware designs of large-scale data center, and aims at maximizing operational efficiency of the 1 large-scale data center to simplify system operations, improve system reliability, maintenance, energy efficiency as well as reduce power consumption. The OCP provides open sharing sources of modularization hardware standards of storage server system. Thus, when there are new control chips, storage device (e.g., Hard Disk Drive (HDD), Solid State Drive (SSD)), server card, storage device control card and related functional elements launched to the market, an operator may remove an old module from the storage server system and replace with a new module, and then execute related firmware update procedures to perform system upgrade.

The storage server system in the market mostly uses the storage device supporting Serial Attached Small Computer System Interface (also known as Serial Attached SCSI, and abbreviated SAS) or Serial Advanced Technology Attachment (abbreviated SATA) interface. However, there are more and more systems using the storage device supporting Non-Volatile Memory Express (abbreviated NVMe) and Peripheral Component Interconnect Express (abbreviated PCIe) transmission interface.

In practice, a central processing unit (or server) of the storage server system cannot directly read data of the SAS/SATA storage device, but indirectly read data through a SAS controller; on the contrary, the central processing unit can directly read data of the NVMe storage device through a PCIe interface. Therefore, when a number of storage devices contained in the storage server system grows, compared with using the SAS/SATA storage device, using the NVMe storage device may significantly reduce reading and writing latency to improve data processing performance and read-write speed of the central processing unit. In addition, a signal bandwidth of the NVMe storage device is wider than a signal bandwidth of the SAS/SATA storage device, a power consumption of NVMe storage device is lower than a power consumption of the SAS/SATA storage device, and the NVMe storage device does not show rail damage like the SAS/SATA storage device does. As expected, the NVMe storage device has the potential to replace the SAS/SATA storage device in the future.

Further, if an NVMe storage module (including multiple NVMe storage devices) is going to add to the storage server system, it shall install an add-in card in a main board of the server, then amplify a PCIe signal through a re-timer of the add-in card, and transmit the PCIe signal to the NVMe storage module through an external cable.

However, applicant notices that the abovementioned operations cannot support hot swap function. For example, both the re-timer and the external cable do not support hot swap control function, which leads to the operator must shut down the storage server system in advance to perform system upgrade and maintenance regarding the NVMe storage module or device. Therefore, there is a need to design a hot swap control circuit and related storage server system for the NVMe storage device, which makes system upgrade and maintenance more convenient and easy.

SUMMARY OF THE INVENTION

It is therefore an objective of the present invention to provide a hot swap control circuit and related storage server system for Non-Volatile Memory Express storage device.

The present invention discloses a hot swap control circuit for a storage server system. The hot swap control circuit includes a first controller configure to detect at least one of a hot remove event and a hot add event of a Non-Volatile Memory Express (hereinafter abbreviated NVMe) storage module of the storage server system, to generate a first control signal; a Peripheral Component Interconnect Express (hereinafter abbreviated PCIe) expander coupled to the first controller, and configure to generate a detection report to a central processing unit of the storage server system according to the first control signal to report at least one of the hot remove event and the hot add event, and generate a second control signal, wherein the first control signal, the detection report and the second control signal indicate at least one of the hot remove event and the hot add event; and a second controller coupled to the PCIe expander and the NVMe storage module, and configure to generate a forbidden read-write signal to the NVMe storage module when the second control signal indicates the hot remove event, and generate an activate read-write signal to the NVMe storage module when the second control signal indicates the hot add event.

The present invention further discloses a storage server system including an NVMe storage module, a central processing unit, and a hot swap control circuit coupled to the NVMe storage module and the central processing unit. The hot swap control circuit includes a first controller, a PCIe expander, and a second controller. The first controller is configured to detect at least one of a hot remove event and a hot add event of the NVMe storage module to generate a first control signal. The PCIe expander is coupled to the first controller, and configure to generate a detection report to the central processing unit according to the first control signal to report at least one of the hot remove event and the hot add event, and generate a second control signal, wherein the first control signal, the detection report and the second control signal indicate at least one of the hot remove event and the hot add event. The second controller is coupled to the PCIe expander and the NVMe storage module, and configure to generate a forbidden read-write signal to the NVMe storage module when the second control signal indicates the hot remove event, and generates an activate read-write signal to the NVMe storage module when the second control signal indicates the hot add event.

Therefore, the storage server system of the present invention can perform hot swap when it is turned on, which makes system upgrade and maintenance more convenient and easy.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
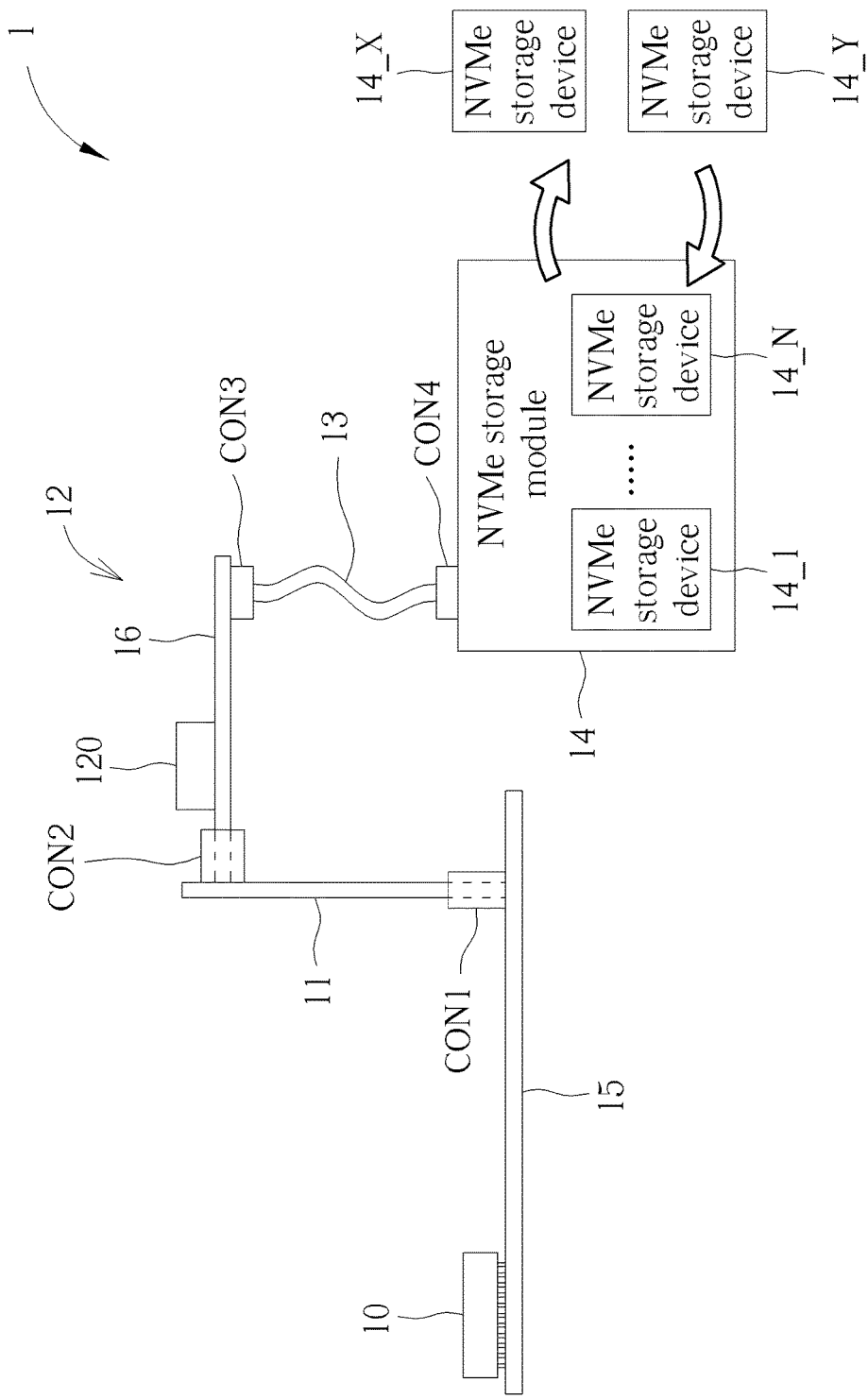
FIG. 1 is a schematic diagram of a storage server system according to an embodiment of the present invention.

FIG. 1 is a schematic diagram of a storage server system 1 according to an embodiment of the present invention. The storage server system 1 includes a central processing unit (or a storage server) 10, a riser card 11, a switch card 12, an external cable 13, a Non-Volatile Memory Express (abbreviated NVMe) storage module 14 and a main board 15. A central processing unit 10 and a connector CON1 are disposed on the main board 15. The riser card 11 includes a connector CON2. The switch card 12 includes a substrate 16, a connector CON3 and a hot swap control circuit 120, wherein the connector CON2 and the hot swap control circuit 120 are disposed on the substrate 16. The NVMe storage module 14 includes multiple NVMe storage devices 14_1-14_N and a connector CON4.

The riser card 11 may be inserted into the connector CON1 to connect to the main board 15, and connect to central processing unit 10 through the main board 15. The switch card 12 may be inserted into the connector CON2 to connect to the riser card 11, and connect to the central processing unit 10 through the riser card 11 and the main board 15. The external cable 13 may be inserted into the connector CON3 to connect to the switch card 12, and inserted into the connector CON4 to connect to the NVMe storage module 14. In short, the riser card 11 is used to connect the central processing unit 10 and the switch card 12, and the external cable 13 is used to connect the switch card 12 and the NVMe storage module 14. In one embodiment, the switch card 12 may be integrated into the main board 15, so the hot swap control circuit 120 of the switch card 12 may directly connect to the central processing unit 10, and the external cable 13 may connect the main board 15 and the NVMe storage module 14, which may reduce signal attenuation due to signal transferring between card and board.

The hot swap control circuit 120 may detect operating status of the NVMe storage module 14 to generate a detection report D_RPT to the central processing unit 10, wherein the detection report D_RPT indicates at least one of a hot remove event H_RMV and a hot add event H_ADD. When at least one of the NVMe storage devices 14_1-14_N (e.g., an NVMe storage device 14_X) is removed, which means a hot remove event H_RMV happens, and thus the hot swap control circuit 120 may report the hot remove event H_RMV to the central processing unit 10 through the detection report D_RPT. In addition, when a new NVMe storage device 14_Y is added to the NVMe storage module 14, which means a hot add event H_ADD happens, and thus the hot swap control circuit 120 may report the hot add event H_ADD to the central processing unit 10 through detection report D_RPT.

The central processing unit 10 may generate a read-write signal RW (including a data signal and a clock signal) through a Peripheral Component Interconnect Express (abbreviated PCIe) transmission interface, and transmit the read-write signal RW to the NVMe storage module 14 through the riser card 11, the switch card 12 and the external cable 13 to read, write or update data of the NVMe storage devices 14_1-14_N.

Given that the NVMe storage device 14_X of the NVMe storage devices 14_1-14_N is removed, the central processing unit 10 may stop reading data of the NVMe storage device 14_X according to the hot remove event H_RMV indicated by the detection report D_RPT. For example, the central processing unit 10 may stop transmitting the read-write signal RW regarding the NVMe storage device 14_X according to the hot remove event H_RMV so as to stop data read-write operations. On the other hand, given that the NVMe storage device 14_Y is added to the NVMe storage module 14, the central processing unit 10 may perform a configuration process to the NVMe storage device 14_Y according to the hot add event H_ADD indicated by the detection report D_RPT indicate, to read data of the NVMe storage device 14_Y. For example, the central processing unit 10 may transmit the read-write signal RW associated with the NVMe storage device 14_Y according to the hot add event H_ADD, to read, write, or update data.

As a result, when the storage server system 1 is in operation, the NVMe storage device 14_X may be replaced by the NVMe storage device 14_Y to perform hot swap, which makes system upgrade and maintenance more convenient and easy. In one embodiment, an operator may remove the NVMe storage module 14 to remove all the NVMe storage devices 14_1-14_N at the same time, and then connect a new NVMe storage module to perform batch hot swap, which is benefit for replacement efficiency.

Figure 2:
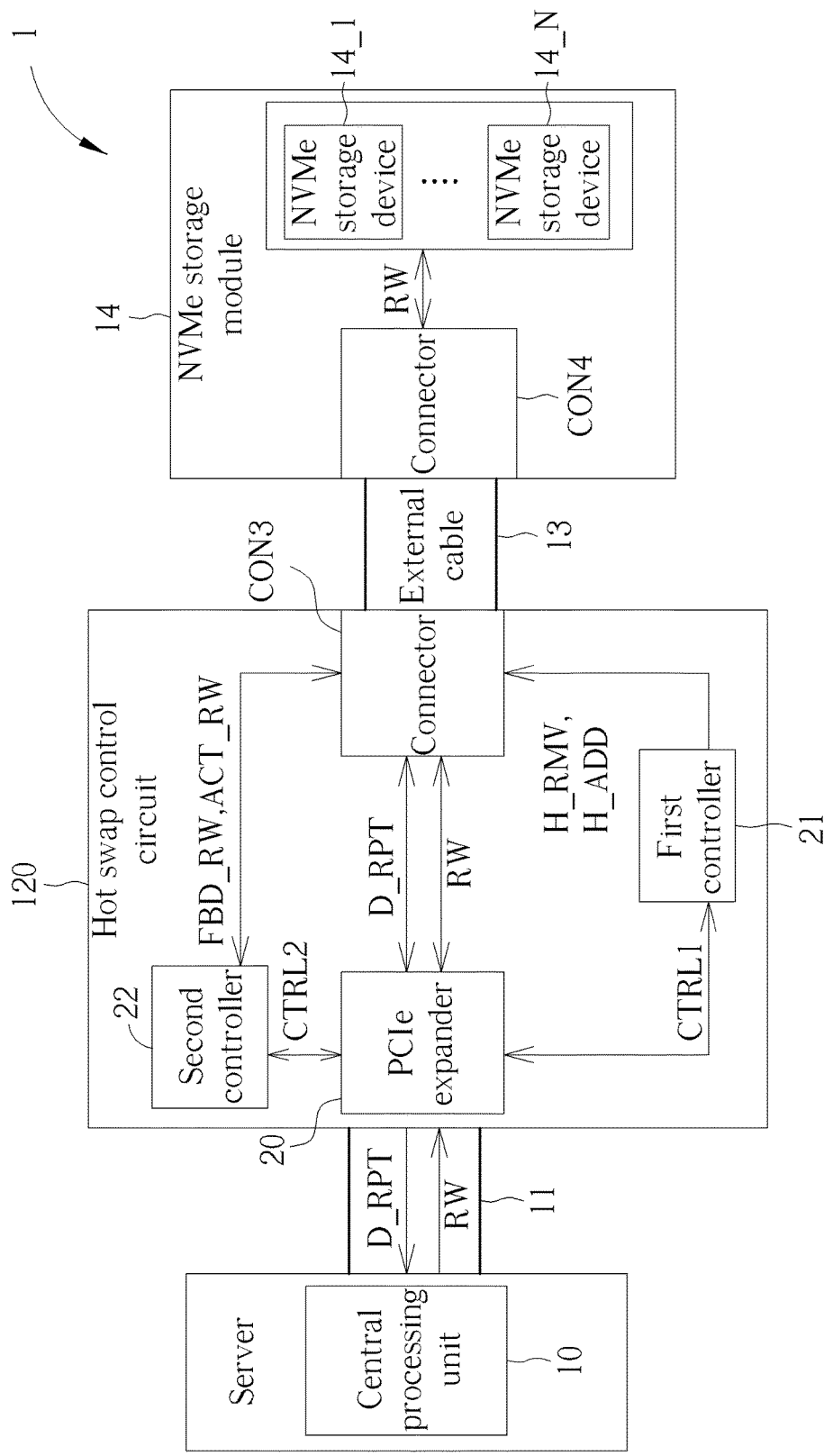
FIG. 2 is a functional block diagram of the storage server system in FIG. 1 according to an embodiment of the present invention.

FIG. 2 is a functional block diagram of the storage server system 1 according to an embodiment of the present invention. In this embodiment, the riser card 11 is not shown in FIG. 2. The hot swap control circuit 120 (or the switch card 12) includes a PCIe expander 20, a first controller 21, a second controller 22 and a connector CON3. The NVMe storage module 14 includes the connector CON4 and the NVMe storage devices 14_1-14_N, wherein the external cable 13 may be inserted into the connector CON3 and the connector CON4 to connect the switch card 12 and the NVMe storage module 14.

The first controller 21 is coupled to the PCIe expander 20 and the connector CON3, and configure to detect at least one of the hot remove event H_RMV and the hot add event H_ADD to generate a first control signal CTRL1 to the PCIe expander 20. The PCIe expander 20 is coupled to the central processing unit 10, the first controller 21, the second controller 22 and the connector CON3, and configured to generate the detection report D_RPT to the central processing unit and generate a second control signal CTRL2 to the second controller 22 according to the first control signal CTRL1. The second controller 22 is coupled to the PCIe expander 20 and the connector CON3, and configure to generate a forbidden read-write signal FBD_RW or an activate read-write signal ACT_RW to the connector CON3 according to the second control signal CTRL2 to transmit the forbidden read-write signal FBD_RW or the activate read-write signal ACT_RW to the NVMe storage module 14.

Given that the NVMe storage device 14_X of the NVMe storage devices 14_1-14_N is removed, the first controller 21 may generate the first control signal CTRL1 to the PCIe expander 20 to indicate that the NVMe storage device 14_X has been removed; then, the PCIe expander 20 generates the detection report D_RPT to the central processing unit 10 according to the first control signal CTRL1, so the central processing unit 10 stops reading data of the NVMe storage device 14_X. In addition, the PCIe expander 20 generates the second control signal CTRL2 to the second controller 22 according to the first control signal CTRL1, to indicate that the NVMe storage device 14_X has been removed; then, the second controller 22 generates the forbidden read-write signal FBD_RW according to the second control signal CTRL2 to stop transmitting the read-write signal RW associated with the NVMe storage device 14_X to the NVMe storage module 14. In one embodiment, the first control signal CTRL1, the second control signal CTRL2 and the forbidden read-write signal FBD_RW indicate a hardware identification of the NVMe storage device 14_X that has been removed.

On the other hand, given that the NVMe storage device 14_Y is added to the NVMe storage module 14, the first controller 21 may generate the first control signal CTRL1 to the PCIe expander 20 to indicate that the NVMe storage device 14_Y has been added; then, the PCIe expander 20 generates the detection report D_RPT to the central processing unit 10 according to the first control signal CTRL1 to notify the new added NVMe storage device 14_Y. In addition, the PCIe expander 20 generates the second control signal CTRL2 to the second controller 22 according to the first control signal CTRL1 to indicate that the NVMe storage device 14_Y has been added; then, the second controller 22 may generate the activate read-write signal ACT_RW according to the second control signal CTRL2 to activate transmitting the read-write signal RW associated with the NVMe storage device 14_Y to the NVMe storage module 14. In one embodiment, the first control signal CTRL1, the second control signal CTRL2 and the activate read-write signal ACT_RW indicate a hardware identification of the NVMe storage device 14_Y that has been added.

In short, the hot swap control circuit 120 (or the PCIe expander 20) may operate as a signal control interface between the central processing unit 10 and the NVMe storage module 14, and configure to report hot remove and hot add events to the central processing unit 10, and also control transmission of the read-write signal RW to the NVMe storage module 14.

As a result, when the storage server system 1 is turned on, the NVMe storage device 14_X may be replaced by the NVMe storage device 14_Y to perform hot swap, which makes system upgrade and maintenance more convenient and easy.

Figure 3:
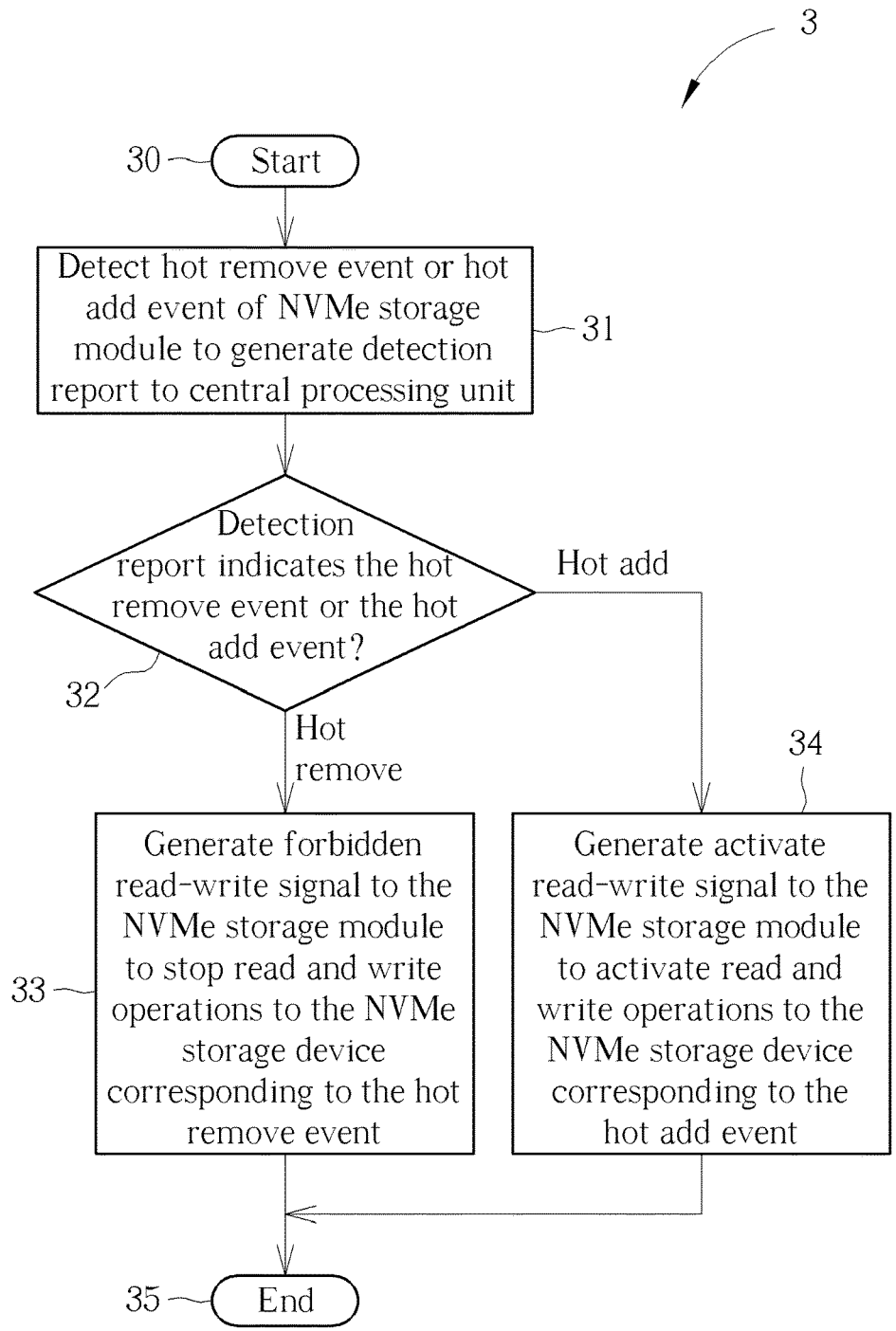
FIG. 3 is a flowchart of a hot swap control process according to an embodiment of the present invention.

Operations regarding the hot swap control circuit 120 (or the PCIe expander 20) may be summarized into a hot swap control process 3. As shown in FIG. 3, the hot swap control process 3 includes the following steps.

Step 30: Start.

Step 31: Detect a hot remove event or a hot add event of an NVMe storage module to generate a detection report to a central processing unit.

Step 32: Determine the detection report indicates the hot remove event or the hot add event. Go to Step 33 if the hot remove event; go to Step 34 if the hot add event.

Step 33: Generate a forbidden read-write signal to the NVMe storage module to stop read and write operations to the NVMe storage device corresponding to the hot remove event.

Step 34: Generate an activate read-write signal to the NVMe storage module to activate read and write operations to the NVMe storage device corresponding to the hot add event.

Step 35: End.

Detailed operations regarding to the hot swap control process 3 may be obtained by referring descriptions regarding FIG. 1 and FIG. 2, which is omitted.

To Sum up, the hot swap control circuit (or the PCIe expander) of the present invention may operate as a signal control interface between the central processing unit (i.e., a server) and the NVMe storage module, and configure to report hot remove and hot add events to the central processing unit, and control transmission of the read-write signal to the NVMe storage module. As a result, the storage server system of the present invention may perform hot swap when it is turned on, which makes system upgrade and maintenance more convenient and easy.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A hot swap control circuit, for a storage server system, comprising:
   a first controller configure to detect at least one of a hot remove event and a hot add event of a Non-Volatile Memory Express (hereinafter abbreviated NVMe) storage module of the storage server system, to generate a first control signal;
   a Peripheral Component Interconnect Express (hereinafter abbreviated PCIe) expander coupled to the first controller, and configure to generate a detection report to a central processing unit of the storage server system according to the first control signal to report at least one of the hot remove event and the hot add event, and generate a second control signal, wherein the first control signal, the detection report and the second control signal indicate at least one of the hot remove event and the hot add event; and
   a second controller coupled to the PCIe expander and the NVMe storage module, and configure to generate a forbidden read-write signal to the NVMe storage module when the second control signal indicates the hot remove event, and generate an activate read-write signal to the NVMe storage module when the second control signal indicates the hot add event.

2. The hot swap control circuit of claim 1, wherein the NVMe storage module comprises multiple NVMe storage devices, when the first controller detects that a first NVMe storage device of the multiple NVMe storage devices is removed, the first controller generates the first control signal to the PCIe expander to indicate that the first NVMe storage device has been removed, and the first control signal, the second control signal and the forbidden read-write signal indicate a first hardware identification of the first NVMe storage device.

3. The hot swap control circuit of claim 1, wherein when the first controller detects a second NVMe storage device is added to the NVMe storage module, the first controller generates the second control signal to the PCIe expander to indicate that the second NVMe storage device has been added, and the first control signal, the second control signal and the activate read-write signal indicate a second hardware identification of the second NVMe storage device.

4. The hot swap control circuit of claim 1, wherein the central processing unit generates a read-write signal to the PCIe expander through a PCIe transmission interface, and transmits the read-write signal to the NVMe storage module through the PCIe expander to read data of at least one of the multiple NVMe storage devices comprised in the NVMe storage module.

5. The hot swap control circuit of claim 4, further comprising a connector configured to connect an external cable of the storage server system, wherein the external cable connects the hot swap control circuit and the NVMe storage module, and is configured to transmit the read-write signal, the forbidden read-write signal and the activate read-write signal to the NVMe storage module.

6. The hot swap control circuit of claim 5, wherein the first controller and the second controller are coupled to the NVMe storage module through the connector.

7. A storage server system, comprising:
   a Non-Volatile Memory Express (hereinafter abbreviated NVMe) storage module;
   a central processing unit; and
   a hot swap control circuit coupled to the NVMe storage module and the central processing unit, and comprising:
      a first controller, configure to detect at least one of a hot remove event and a hot add event of the NVMe storage module to generate a first control signal;
      a Peripheral Component Interconnect Express (hereinafter abbreviated PCIe) expander coupled to the first controller, and configure to generate a detection report to the central processing unit according to the first control signal to report at least one of the hot remove event and the hot add event, and generate a second control signal, wherein the first control signal, the detection report and the second control signal indicate at least one of the hot remove event and the hot add event; and
      a second controller coupled to the PCIe expander and the NVMe storage module, and configure to generate a forbidden read-write signal to the NVMe storage module when the second control signal indicates the hot remove event, and generates an activate read-write signal to the NVMe storage module when the second control signal indicates the hot add event.

8. The storage server system of claim 7, wherein the NVMe storage module comprises multiple NVMe storage devices, when the first controller detects that a first NVMe storage device of the multiple NVMe storage devices is removed, the first controller generates the first control signal to the PCIe expander to indicate that the first NVMe storage device has been removed, and the first control signal, the second control signal and the forbidden read-write signal indicate a first hardware identification of the first NVMe storage device.

9. The storage server system of claim 7, wherein when the first controller detects a second NVMe storage device is added to the NVMe storage module, the first controller generates the second control signal to the PCIe expander to indicate that the second NVMe storage device has been added, and the first control signal, the second control signal and the activate read-write signal indicate a second hardware identification of the second NVMe storage device.

10. The storage server system of claim 7, further comprising:
    a main board disposed with the central processing unit and a first connector;
    a riser card comprising a first substrate and a second connector, wherein the riser card is inserted into the first connector to connect to the main board;
    a switch card comprising a second substrate and a third connector, wherein the second substrate is disposed with the hot swap control circuit and the second connector, and the switch card is inserted into the second connector to connect to the riser card, and connects to the central processing unit through the riser card and the main board; and
    an external cable, wherein the external cable is inserted into the third connector to connect to the switch card, and is configured to connect the hot swap control circuit and the NVMe storage module.

11. The storage server system of claim 7, wherein the central processing unit generates a read-write signal to the PCIe expander through a PCIe transmission interface, and transmits the read-write signal to the NVMe storage module through the PCIe expander to read data of at least one of the multiple NVMe storage devices comprised in the NVMe storage module.

12. The storage server system of claim 11, wherein the hot swap control circuit is further configure to transmit the read-write signal, the forbidden read-write signal and the activate read-write signal to the NVMe storage module.

13. The storage server system of claim 10, wherein the first controller and the second controller are coupled to the NVMe storage module through the third connector.

* * * * *